(12) United States Patent
Ayad

(10) Patent No.: US 12,496,930 B2
(45) Date of Patent: Dec. 16, 2025

(54) METHOD FOR CONTROLLING A BATTERY SYSTEM

(71) Applicant: Vitesco Technologies GmbH, Regensburg (DE)

(72) Inventor: Ayman Ayad, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 599 days.

(21) Appl. No.: 17/978,401

(22) Filed: Nov. 1, 2022

(65) Prior Publication Data

US 2023/0140732 A1    May 4, 2023

(51) Int. Cl.
*B60L 58/15*      (2019.01)
*H01M 50/569*   (2021.01)

(52) U.S. Cl.
CPC ........... *B60L 58/15* (2019.02); *H01M 50/569* (2021.01); *B60L 2240/549* (2013.01); *H01M 2220/20* (2013.01)

(58) Field of Classification Search
CPC ............... B60L 58/15; B60L 2240/549; B60L 2240/545; B60L 3/0046; B60L 58/14;
(Continued)

(56) References Cited

U.S. PATENT DOCUMENTS 7,400,113 B2 *   7/2008  Osborne ............... H02J 7/0018
                                                              320/118
9,065,154 B2    6/2015  Butzmann
(Continued)

FOREIGN PATENT DOCUMENTS

CN       1945345 A   *  4/2007  ................ B60L 3/00
CN    109061501 A   * 12/2018  ............. G01R 31/36
DE   102009027833 A1    1/2011

OTHER PUBLICATIONS

N. Mukherjee and D. Strickland, "Control of Second-Life Hybrid Battery Energy Storage System Based on Modular Boost-Multilevel Buck Converter," in IEEE Transactions on Industrial Electronics, vol. 62, No. 2, pp. 1034-1046, Feb. 2015 (Year: 2015).*

(Continued)

*Primary Examiner* — M Baye Diao
(74) *Attorney, Agent, or Firm* — Buchanan Ingersoll & Rooney PC

(57) ABSTRACT

Method for controlling a battery system that includes a battery with at least one string of battery modules connected in series. Each battery module including a number of battery cells connected in parallel and/or in series. At least a number of battery modules including a power electronics unit connected in series via their respective power electronics unit. The power electronics unit having a DCDC converter operable at least in buck mode, boost mode, and bypass mode. The method includes specifying a DC link voltage for the battery; specifying a first distribution of the set DC link voltage for all modules; determining a state of charge and/or a temperature for all modules; determining a deviation of the state of charge and/or of the temperature of each module from an average value; specifying a second distribution of the set DC link voltage. The set voltage for each module is corrected depending on deviation of state of charge and/or of temperature of each module from the average value.

12 Claims, 5 Drawing Sheets

(58) Field of Classification Search
CPC .... B60L 58/16; B60L 58/25; B60L 2240/547; B60L 58/22; B60L 53/00; H01M 50/569; H01M 2220/20; H01M 10/425; H01M 10/482; H01M 10/441; H02J 2207/20; H02J 2310/48; H02J 7/0018; H02J 7/00712; H02J 7/007182; H02J 7/007194; H02J 7/00302; H02J 7/00309; H02J 7/0047; H02J 7/0048
USPC .......................................................... 320/132
See application file for complete search history.

(56) References Cited

U.S. PATENT DOCUMENTS

| | | | | |
|---|---|---|---|---|
| 10,084,323 | B2* | 9/2018 | Fetzer | H01M 10/482 |
| 10,449,868 | B2* | 10/2019 | Hale | G05F 1/462 |
| 10,703,211 | B2* | 7/2020 | Chuang | B60L 58/22 |
| 10,766,371 | B1* | 9/2020 | Duan | B60L 50/00 |
| 11,228,185 | B2* | 1/2022 | Hensley | H02J 7/0013 |
| 2008/0042493 | A1 | 2/2008 | Jacobs | |
| 2010/0213897 | A1* | 8/2010 | Tse | H02J 7/0013 320/126 |
| 2015/0295430 | A1* | 10/2015 | Wright | H02J 7/00047 307/43 |
| 2016/0197498 | A1 | 7/2016 | Mercier et al. | |
| 2020/0269704 | A1 | 8/2020 | Duan et al. | |
| 2021/0006076 | A1* | 1/2021 | Rentel | H02J 7/0024 |
| 2021/0320507 | A1* | 10/2021 | Hensley | H01M 10/441 |
| 2022/0357405 | A1* | 11/2022 | Rise | H01M 10/4257 |
| 2022/0385080 | A1* | 12/2022 | Bijlenga | H02J 7/0024 |
| 2023/0006535 | A1* | 1/2023 | Freijedo Fernández | H02M 7/53873 |

OTHER PUBLICATIONS

Walker, G.R., et al., "Cascaded DC-DC Converter Connection of Photovoltaic Modules", IEEE Transactions on Power Electronics, Jul. 2004, vol. 19(4), pp. 1130-1139.

Extended European Search Report for European Application No. 21205842.4, dated May 3, 2022, 9 pages.

* cited by examiner

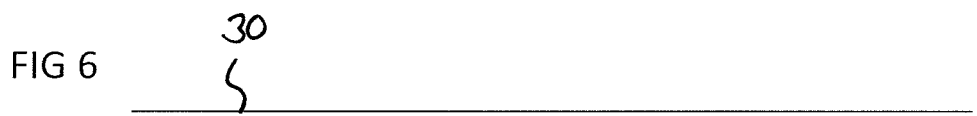
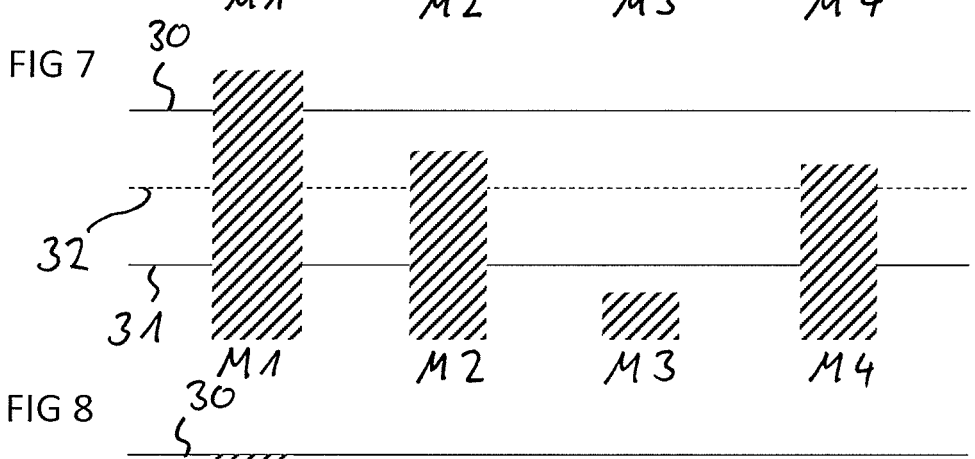
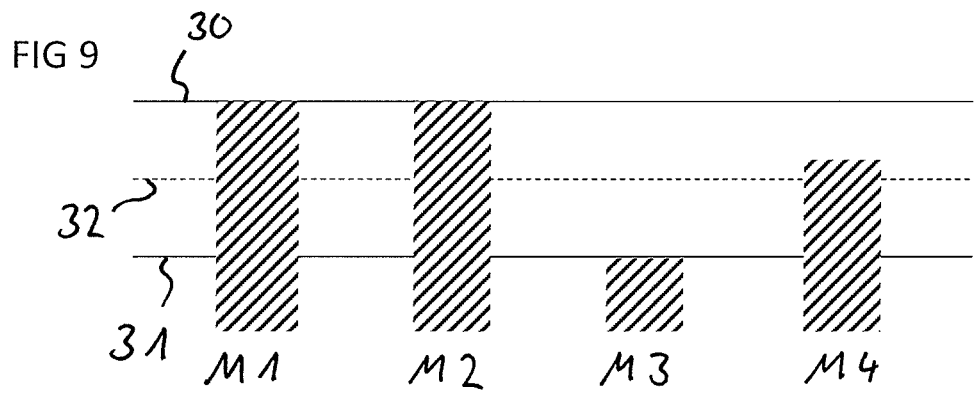

METHOD FOR CONTROLLING A BATTERY SYSTEM

CROSS REFERENCE TO RELATED APPLICATIONS

This application claims priority to European Patent Application No. 21205842, filed Nov. 2, 2021, the contents of such application being incorporated by reference herein.

FIELD OF THE INVENTION

The present invention relates to a method for controlling a battery system, for example, for a hybrid vehicle or a fully electric vehicle.

BACKGROUND OF THE INVENTION

The high voltage battery pack of a battery electric vehicle or a plug-in hybrid electric vehicle is typically built by grouping battery cells in parallel and in series to compose battery cell modules. These modules are then connected in series to provide the required high-voltage on the DC link of the battery pack.

For this kind of battery pack, the temperatures and voltages of each cell are monitored using a cell supervision circuit for each module and the data is sent to the battery management controller. The battery management controller determines a state of charge (SoC) and a state of health for each cell. According to the determined state of charge and state of health, the battery management controller sends control signals to the cell balancers which can balance the voltage of the cells according to known methods.

The cells imbalance results from the fact that the cells are different in terms of capacity, internal resistance, chemical degradation, and intercell temperature. The cell-balancing is crucial to prevent cell overcharging and discharging, which would result in a decrease of the total storage capacity and lifetime. Furthermore, the imbalance can result in overvoltage which can destroy the cells and cause serious damage.

Another problem of cell imbalance is that it might cause incomplete charging of the battery and therefore lead to decreased capacity and incomplete usage of battery energy. There are active and passive balancing techniques which are either relatively cheap but slow or relatively fast but expensive.

Other approaches have been made to achieve a more efficient charging and discharging of a battery in an electric vehicle. In particular, a DCDC converter has been assigned to each battery module in order to control the output voltage of each module. Such a battery system is for example disclosed in DE 10 2000 902 7833 A1 and in US 2008/004 2493 A1, each incorporated herein by reference. The systems allow a more flexible charging and discharging of individual battery modules.

SUMMARY OF THE INVENTION

An aspect of the present invention is a method for controlling a battery system which has an improved lifetime and capacity, is secure and easy to operate and may be used very flexibly.

According to an aspect of the invention, a method for controlling a battery system is provided, the battery system comprising a battery with at least one string of battery modules connected in series, each battery module comprising a number of battery cells connected in parallel and/or in series. At least a number of battery modules comprise a power electronics unit and are connected in series via their respective power electronics unit, the power electronics unit having a DCDC converter operable at least in buck mode, boost mode and bypass mode to bypass the respective battery module. The DCDC converter is thus controllable to set a module voltage for the respective module.

For example, the battery system is for an electric vehicle, in particular, for a hybrid vehicle or a fully electric vehicle. Alternatively, the battery system may also be part of a stationary power storage. For instance, the battery system may be for a photovoltaic system.

The method comprises specifying a set DC link voltage for the battery and specifying a first distribution of the set DC link voltage for all modules (or at least for most of modules) by providing a set module voltage for each module. A distribution or allocation of the set DC link voltage is hereby defined as a combination of module voltages adding up to a DC link voltage. As the individual modules are decoupled from each other by the power electronics units comprising the DCDC converters, different module voltages can be set and different distributions of the set DC link voltage are possible. In particular, the first distribution may be an equal distribution, i.e. the set DC link voltage is (will be) distributed equally over all modules (or at least over most of modules) of the battery.

The method further comprises determining a state of charge and a temperature for all modules (or at least for most of modules) and determining a deviation of the state of charge and/or of the temperature for each module from an average value. According to this step, the different states of charge and/or the different temperatures and the different states of health of each module are considered.

The expression "a number of battery modules/battery cells" is here used to indicate "at least one battery module/battery cell".

According to an aspect of the invention, at least some, if not all, battery modules of the battery system comprise a power electronics unit having a DCDC converter. The DCDC converters each have two input terminals and two output terminals, the input terminals being connected to the battery cells of the respective module and the output terminals being connected in series to the next, i.e. the subsequent and the preceding, battery modules of the string. Thus, the battery modules are connected in series via their power electronics unit.

The power electronics units in particular comprise switches operable by a control unit for switching the respective battery module into a bypass mode, a buck mode or a boost mode. In the bypass mode, the DC link bypasses the respective module, i.e. the respective module does not contribute to the DC link voltage. In buck mode/boost mode, the current/voltage on the cell side is controllable and can be set to a predetermined level by controlling the DCDC accordingly. Hence, a module voltage can be set independently from other modules and the individual modules are (will be) decoupled from each other.

This battery system has the advantage, that the current of each battery module can be optimised to ensure an even load of the battery modules, so that different modules can contribute differently to the DC link voltage. Furthermore, it is possible to charge the battery either from a 400V or 800V charging station. Because of the DCDC converters, the voltage can be boosted on the DC-link side to a higher value.

The method further comprises specifying a second distribution of the set DC link voltage, wherein the set voltage for each module is (will be) corrected depending on the deviation of the SoC and/or of the temperature of each module from the average value.

This method has the advantage, that a conventional balancing of cells and cell modules is not necessary. Instead, balancing is (will be) achieved by the different load currents of the individual modules caused by the different module voltages. Therefore, balancing is achieved by the load distribution: a higher module voltage leads to more current actuation and a lower module voltage leads to less current actuation. Thus, balancing takes place during operation, i.e. during traction as well as during charging, without losses.

According to an embodiment of the invention, the set voltage for each module is (will be) corrected using a proportional control method comprising determining a proportional offset for the state of charge and/or temperature of the modules. This can in particular be done by determining a deviation of the state of charge and/or the temperature of each module and multiplying this arrow with the state of charge gain or the temperature again. The result may be processed further, in particular by multiplying it with a weighing factor and with an inverting factor is needed. The offsets in state of charge and in temperature can be combined and the resulting proportional offset used to correct the module voltage.

This has the advantage, that the state of charge and/or the temperature of the modules are (will be) accounted for in a robust and simple way.

According to an embodiment, a third distribution of the set DC link voltage is (will be) provided, if predetermined constraints are not satisfied by the second distribution.

This embodiment takes into account that the second distribution may lead to module voltages, which exceed predetermined limits, in particular minimum and maximum values for the set voltage for each module or limits for a charge and discharge current and/or for cell temperatures and/or for the state of charge of the modules. Module voltages exceeding limits are infeasible outputs and should thus be corrected.

The third distribution may be provided by redistributing the set DC link voltage so that the predetermined constraints are (will be) satisfied, and in a subsequent step by ensuring that the set DC link voltage for the battery is (will be) achieved by using a linear programming method.

The redistribution of the set DC link voltage so that the predetermined constraints are satisfied, can e.g. be done by saturating module voltages below the minimum limit to the minimum limit and saturating module voltages above the maximum limit to the maximum limit so that all module voltages are feasible. This, however, may lead to module voltages, which do not sum up to the set DC link voltage. Hence, in the subsequent step, the module voltages are redistributed again to make sure the set DC link voltage is achieved. In this step, a linear programming method may be used to optimise the distribution of the DC link voltage among the individual modules and at the same time ensuring that all module voltages sum up to the set DC link voltage, that limits or constraints are not exceeded and that the determined proportional offsets and the resulting correction is respected.

In an alternative embodiment, different algorithms may be used to optimise the distribution of the DC link voltage among the individual modules, in particular algorithms that use swarm intelligence, e.g. ant colony algorithms.

According to an embodiment of the invention, the method further comprises a fault detection and fault handling routine to monitor a minimum and maximum voltage during charging and discharging and/or a maximum charge and discharge current and/or a minimum and maximum temperature and/or a minimum and maximum state of charge, wherein individual limits are set for different modules.

According to this embodiment, the battery management system may define different limits (minimum and maximum values) for different modules to handle modules which might be treated as faulty in a conventional system. This has the advantage, that non-terminal faults allow continuation of operation, for example of the vehicle, as the modules are no longer dependent on each other and faulty modules may be operated with a lower load or even bypassed. Moreover, healable faults enable components to be re-activated.

This embodiment has the advantage, that for example the vehicle might be operable even if some modules are faulty, and therefore has a higher reliability and is more fault-tolerant.

According to an embodiment, the set module voltages for each module are outputted by a battery management system of the battery system to control the DCDC converters of the respective modules. The set module voltages may be the module voltages according to the second or the third distribution, depending on whether or not the second distribution respects predetermined constraints.

According to an aspect of the invention, a computer program product is provided comprising instructions which, when the program is executed by a computer, cause the computer to carry out the described method. Furthermore, a computer-readable storage medium is provided comprising instructions which, when executed by a computer, cause the computer to carry out the described method. The computer may in particular be a vehicle control unit of an electric vehicle.

BRIEF DESCRIPTION OF THE DRAWINGS

Embodiments of the present invention are described with reference to schematic figures.

FIG. 6 illustrates an allocation of set module voltages after a first step of the method according to FIG. 4, FIG. 7 illustrates an allocation of set module voltages after a second step of the method according to FIG. 4, FIG. 8 illustrates an allocation of set module voltages after a third step of the method according to FIG. 4 and FIG. 9 illustrates an allocation of set module voltages after a fourth step of the method according to FIG. 4.

DETAILED DESCRIPTION OF THE PREFERRED EMBODIMENTS

Figure 1:
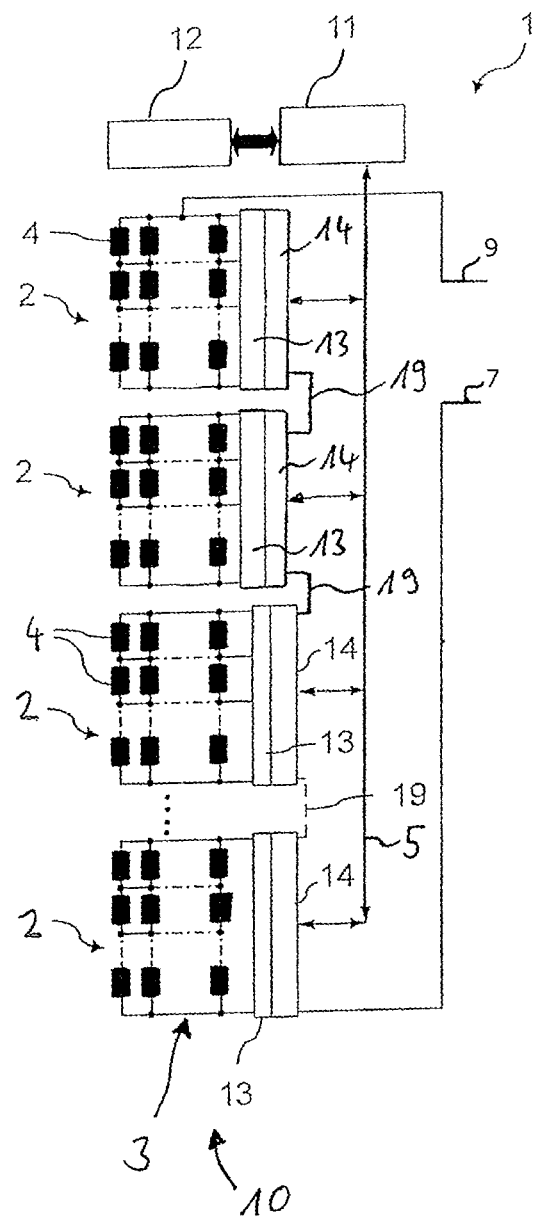
FIG. 1 shows a battery system according to an embodiment of the present invention.

FIG. 1 shows a battery system 1. The battery system 1 comprises a battery 10 and other components, in particular a battery management system 11 and a battery junction box, which is not shown in FIG. 1. The battery 10 comprises a number of battery modules 2. The battery modules 2 are connected in series to form a string 3. In the embodiment shown in FIG. 1, the battery comprises only one string 3. The modules 2 provide the DC link voltage between the main contactors 7, 9 of the battery system 1. The nominal voltage of each module 2 may e.g. be 48 V.

The battery modules 2 are comprised of battery cells 4, which are connected in series and parallel to form a battery module 2. Furthermore, each battery module 2 has a cell supervision circuit 13 which supervises cell voltage and cell temperatures. The cell supervision circuit 13 communicates with a battery management system 11 of the battery system 1 to transmit voltage and temperature measurements to the battery management system 11. The cells 4 of a module 2 may be grouped into cell packs connected in parallel. Each cell pack may be supervised by the supervision circuit 13, i.e. cell pack voltage, cell pack current and cell pack temperature are measured.

The battery modules 2 each comprise a power electronics unit 14 having a DCDC converter. The DCDC converters can be used to set the module voltage of the respective battery module 2 to a predetermined value. Furthermore, the DCDC converters are controlled to bypass certain modules 2 if necessary. To achieve this, the DCDC converters of the power electronics units 14 are operable at least in buck mode, boost mode and also in bypass mode.

The battery modules 1 are connected to each other in series via their power electronics units 14, which is indicated by the connections 19.

In operation, for example of the electric vehicle, i.e. while charging or while drawing current from the battery for traction, the battery management system 11, which communicates with a vehicle control unit 12, receives all voltage and current measurements and temperature measurements from the battery modules 2 via a serial peripheral interface (SPI) 5 and then estimates the state of charge of each cell 4 and the average state of charge for each module 2. For a certain requested DC link voltage from the vehicle control unit 12, the battery management system 11 decides which battery modules 2 should contribute to the DC link voltage and how much. The reference voltage or module voltage for the DCDC converters for each of these modules 2 is determined according to a method described below. The DCDC converters are then controlled accordingly to deliver the desired output voltage or to bypass the certain battery module 2.

Thus, the power electronics units 14 comprising the DCDC converters decouple the battery modules 2 from each other.

Figure 2:
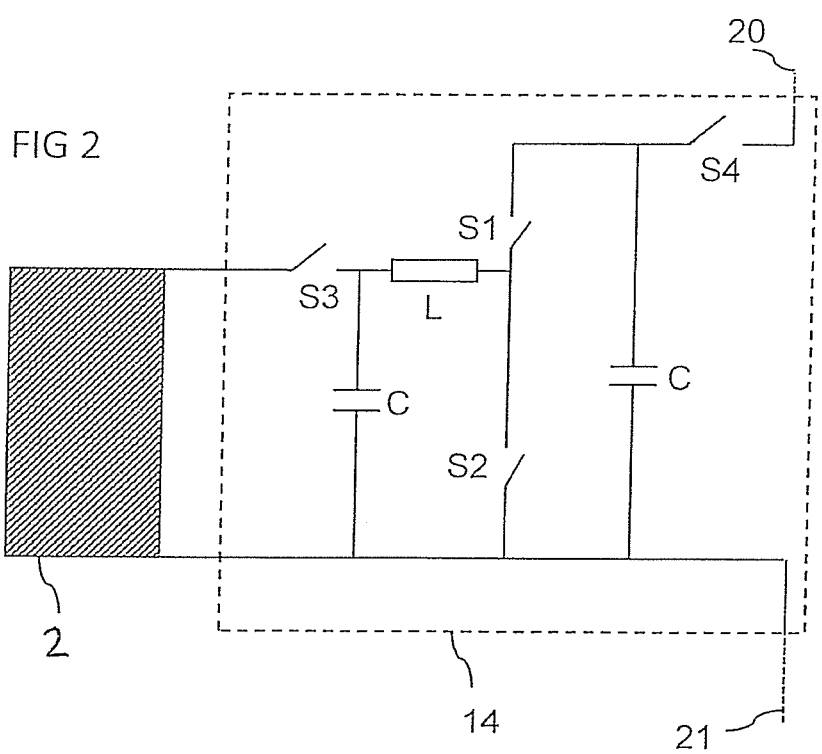
FIG. 2 shows a part of the battery system according to FIG. 1.

FIG. 2 shows an exemplary battery module 2 of the battery system 1 according to FIG. 1 and its power electronics unit 14. The cell supervision circuit is not shown in FIG. 2. According to this embodiment, the power electronics unit 14 comprises a DCDC converter and additional switches to control different modes of operation of the power electronics unit 14. In a buck/boost mode, switch S3 and S4 are on and switches S1 and S2 are switching. In the buck/boost mode, the voltage drop between terminals 20 and 21 can be set to a predetermined voltage according to a state of charge of the battery module 2 and according to a demand from, for example, the vehicle control unit 12.

In a bypass mode, switches S1, S2 and S4 are on and switch S3 is off, so that the battery module 2 is bypassed. This mode can be chosen, when a certain battery module is not required to contribute to the operation, for example, of the electric vehicle or when a certain battery module 2 is defective. In particular, the bypass mode can be chosen when only some battery modules 2 shall contribute. Hence, the number of modules 2 which should contribute at a certain time is fully flexible and the battery 1 is switchable to deliver a predetermined DC link voltage.

In a path-through mode, switches S1, S3 and S4 are on and switch 2 is off. In this mode, the battery module 2 is operated in a conventional mode without adjusting the output voltage.

Furthermore, the power electronics unit 14 can be operated in a standby mode, where switches S1 and S2 are off and switches S3 and S4 are on, and in an open circuit mode, in which all switches are off and no high voltage is present.

The switches S1, S2, S3 and S4 are controlled by the battery management system 11.

Figure 3:
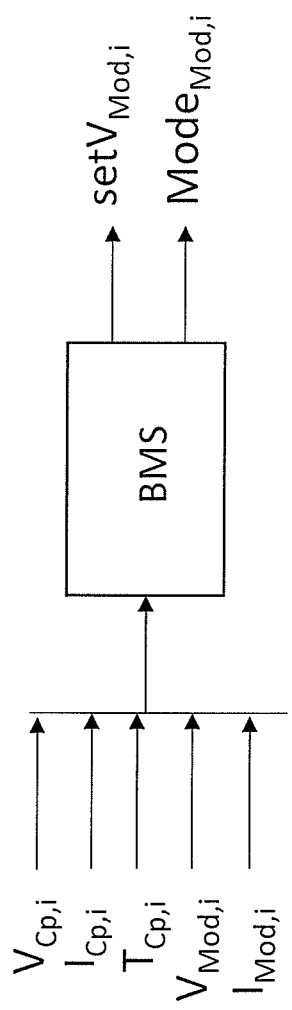
FIG. 3 shows input and output values of a battery management system according to an embodiment of the invention.

FIG. 3 shows the input and output values for the battery management system according to the method of an aspect of the present invention. According to the embodiment shown in FIG. 3, the battery management system receives the cell pack voltage $V_{Cp}$ for every cell pack, the cell pack current $I_{Cp}$ for every cell pack, the cell pack temperature $t_{Cp}$ for each cell pack, the actual value of the module voltage $V_{Mod}$ for each module and the module current $I_{Mod}$ for each module. The output values are the set module voltage set$V_{Mod}$ for each module and the mode of operation $Mode_{Mod}$ for each module. The output values are determined by the method described below with reference to FIGS. 4 to 9.

Figure 4:
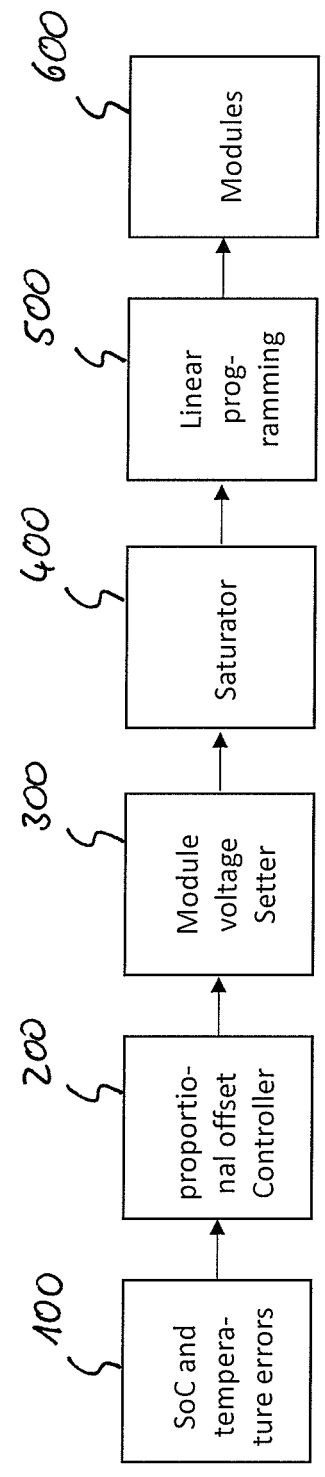
FIG. 4 shows a method for controlling the battery system according to an embodiment of the invention.

FIG. 4 illustrates steps of the method for controlling the battery system according to an embodiment of the invention. In a step 100, the state of charge and the temperature for all modules are determined and an average value is calculated. Subsequently, a deviation of the state of charge and the temperature from an average value is determined for each module. This deviation is denoted as state of charge and temperature error in FIGS. 4 and 5.

In a step 200, a proportional offset controller determines a proportional offset which is used to correct the module voltage with regard to the state of charge and temperature errors. The proportional offset controller is described below with reference to FIG. 5.

When the state of charge and temperature errors are accounted for by determining the determined proportional offset for each module, a module voltage is set for each module in step 300.

In a step 400, a saturator determines if predetermined constraints are exceeded. If this is the case, a redistribution of the set DC link voltage among the individual modules is determined in step 400 and in the subsequent step 500 by a linear programming method. In step 600, the determined set module voltages are outputted to the modules, i.e. the respective power electronics units are controlled accordingly.

Figure 5:
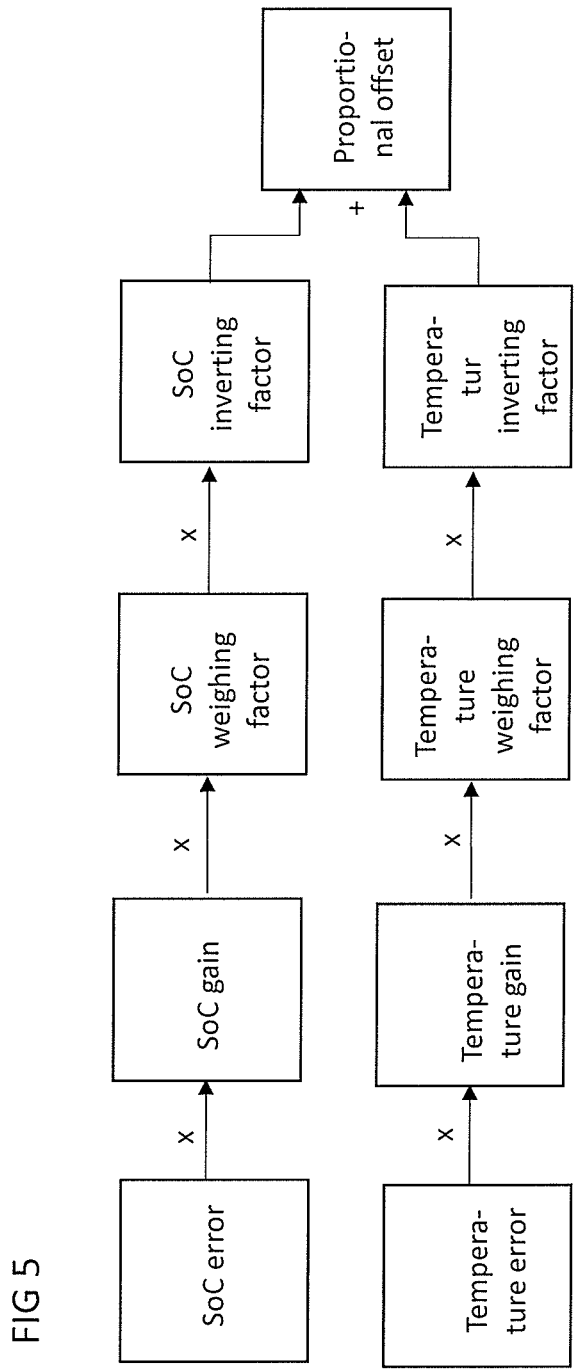
FIG. 5 illustrates a part of the method according to FIG. 4.

FIG. 5 illustrates the proportional offset controller in more detail. The proportional offset controller considers that the set module voltages should be proportional to imbalances of the state of charge and the temperatures to balance the modules during operation. Therefore, a proportional offset is calculated as a correction to the set module voltages according to FIG. 5: a state of charge error and a temperature error (deviation from an average value) are determined for each module and multiplied by the respective gain and furthermore by a weighing factor.

The weighting factor controls the percentage of SoC or temperature balancing, as they are contradicting goals. The gain is known or may be determined for the certain type of module. The result is multiplied by an inverting factor, wherein the state of charge inverting factor is 1 when discharging and −1 when charging and wherein the temperature inverting factor is −1 in any case. At last, the state of charge and temperature offsets are combined and used as a proportional offset to correct the set module voltages.

FIGS. 6 to 9 illustrate an exemplary allocation or distribution of a set DC link voltage among four modules M1 to M4 according to an embodiment of the present invention, wherein the hatched areas denote the module voltages of modules M1 to M4. Line 30 illustrates a maximum limit for the module voltage, line 31 illustrates a minimum limit for the module voltage. Voltages above the maximum and below the minimum are not feasible. Dotted line 32 illustrates a module voltage of 12 V. In the example shown in FIGS. 6 to 9, a DC link voltage of 48 V is required. Consequentially, the module voltages of modules M1 to M4 have to sum up to 48 V. In FIG. 6, a first allocation or distribution of the DC link voltage of 48 V is set by distributing the DC link voltage equally among the four modules, resulting in a set module voltage of 12 V for each module.

However, due to different states of charge and different temperatures, the individual modules should be set different module voltages to balance the modules during operation. In a first step, proportional offsets are determined for each module, the result of which is shown in the new allocation or distribution of the DC link voltage in FIG. 7. In this example, some module voltages exceed predetermined limits, in particular module M1 and module M3. The module voltages according to the allocation shown in FIG. 7 are 16 V for 1, 13 V for M2, 8 V for M3 and 11 V for M4, which sum up to the DC link voltage of 48 V.

FIG. 8 shows the result of the first step of a redistribution of the DC link voltage among the modules: the module voltages exceeding predetermined constraints are redistributed. In particular, module voltages below the minimum limit are saturated to the minimum limit and module voltages above the maximum limit are saturated to the maximum limit so that all module voltages are feasible. However, after this redistribution, the module voltages do not sum up to the DC link voltage of 48 V, because the module voltages according to the allocation shown in FIG. 8 are 14 V for 1, 13 V for M2, 9 V for M3 and 11 V for M4.

Therefore, in a further step of the redistribution, the result of which is shown in FIG. 9, a linear programming method is used to find, starting from the allocation shown in FIG. 8, an allocation which respects the predetermined limits and the proportional offset correction and results in an allocation where all module voltages sum up to the requested DC link voltage. According to the allocation shown in FIG. 9, the set module voltages are $setV_{Mod}1=16$ V, $setV_{Mod}2=13$ V, $setV_{Mod}3=8$ V and $setV_{Mod}4=11$ V, which are outputted to the respective power electronics units.

The invention claimed is:

1. A method for controlling a battery system, the battery system comprising a battery with at least one string of battery modules connected in series, each battery module comprising a number of battery cells connected in parallel and/or in series,
    wherein at least a number of battery modules comprise a power electronics unit and are connected in series via their respective power electronics unit,
    the power electronics unit having a DCDC converter operable at least in buck mode, boost mode and bypass mode to bypass the respective battery module, the DCDC converter being thus controllable to set a module voltage for the respective module,
    wherein the method comprises:
    specifying a set DC link voltage for the battery;
    specifying a first distribution of the set DC link voltage for all modules by providing a set module voltage for each module;
    determining a state of charge and/or a temperature for all modules;
    determining a deviation of the state of charge and/or of the temperature of each module from an average value; and
    specifying a second distribution of the set DC link voltage, wherein the set voltage for each module is corrected depending on the deviation of the state of charge and/or of the temperature of each module from the average value.

2. The method according to claim 1,
    the set voltage for each module is corrected using a proportional control method comprising determining a proportional offset for the state of charge and/or temperature of the modules.

3. The method according to claim 1, wherein a third distribution of the set DC link voltage is provided, if predetermined constraints are not satisfied by the second distribution.

4. The method according to claim 3,
    wherein the predetermined constraints include a minimum and maximum value for the set voltage for each module.

5. The method according to claim 3, wherein the predetermined constraints include limits for a charge and discharge current and/or for cell temperatures and/or for state of charge of the modules.

6. The method according to claim 1, wherein the third distribution is provided by
    redistributing the set DC link voltage, so that the predetermined constraints are satisfied and
    in a subsequent step ensuring that the set DC link voltage for the battery is achieved by using a linear programming method.

7. The method according to claim 1, wherein the set module voltages for each module are outputted by a battery management system of the battery system to control the DCDC converters of the respective modules.

8. The method according to claim 1, furthermore comprising a fault detection and fault handling routine to monitor:
    minimum and maximum voltage during charging and discharging and/or
    a maximum charge and discharge current and/or
    minimum and maximum temperature and/or
    minimum and maximum state of charge,
    wherein individual limits are set for different modules.

9. A non-transitory computer program product comprising instructions which, when the program is executed by a computer, cause the computer to carry out the method according to claim 1.

10. A non-transitory computer-readable storage medium comprising instructions which, when executed by a computer, cause the computer to carry out the method according to claim 1.

11. The method according to claim 2, wherein a third distribution of the set DC link voltage is provided, if predetermined constraints are not satisfied by the second distribution.

12. The method according to claim 4, wherein the predetermined constraints include limits for a charge and discharge current and/or for cell temperatures and/or for state of charge of the modules.

* * * * *